Patented June 5, 1951

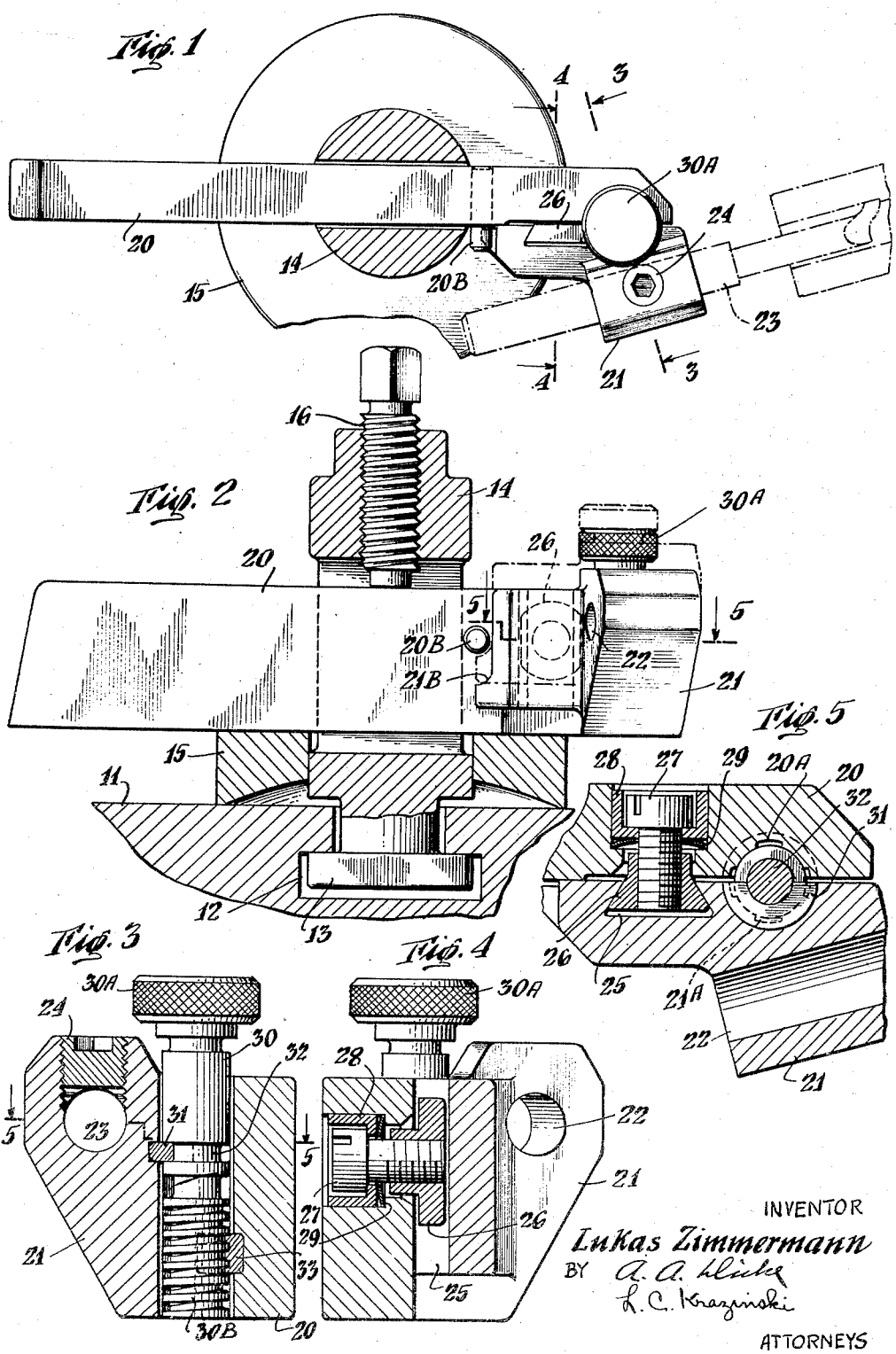

2,555,386

UNITED STATES PATENT OFFICE 2,555,386

SCREW CLAMP

Lukas Zimmermann, Birmingham, Mich.

Application July 27, 1945, Serial No. 607,399

7 Claims. (Cl. 74—424.8)

This invention relates to tool holders and has for an object to provide an improved tool holder for machine tools, particularly lathes and boring mills, and adapted particularly for mounting boring bars.

In using boring bars in a lathe or boring mill, it is necessary to so adjust the boring bar that the cutting lip of the bar is at a proper height relative to the axis of rotation of the workpiece, viz. the axis of the work holder such as the headstock of a lathe. This adjustment has been usually accomplished heretofore by rocking the boring tool holder in the tool post by the use of the ordinary rocker provided for this purpose. A difficulty arising therefrom is that due to the rocking adjustment the boring bar is given a tilted position so that it may interfere with the work, particularly when small holes are being bored, i. e., holes not much larger than the diameter of the boring bar. Furthermore, during adjustment the tool may get out of adjustment by rotating about the axis of the tool post. It is an object of this invention to overcome this difficulty by providing for vertical adjustment of the boring bar while maintaining the axis of the bar parallel to the headstock axis, i. e., parallel to the ways of the lathe.

It is another object to provide such a holder wherein the boring bar is held against rotation about its axis during vertical adjustment.

It is another object to provide such a holder wherein the boring bar is held against rotation about the axis of the tool post during vertical adjustment.

Another object is to provide such vertical adjustment by the use of a lead screw or other micrometric means.

Another object is to provide a positive and rigid clamping means for holding the parts in adjusted position preferably so arranged that the parts will be held frictionally when the clamp is released for vertical adjustment of the parts.

Another object is to provide such a holder in which the vertically adjustable tool holding part thereof is adjusted vertically by means of a lead screw which also serves as a guide during adjustment and upon which the relatively movable parts are clamped by suitable clamping means, whereby the lead screw serves to guide and align the parts and said clamping means serves also to lock the lead screw against rotation.

Another object is to provide such a holder which may be used in the ordinary tool post.

Inasmuch as the invention is adapted for use in other structures than that hereinafter specifically described, a further object is to provide a mechanism for moving or adjusting relatively movable members constructed and arranged to simultaneously act as a guiding means for such movement.

Further objects and advantages of this invention will be apparent from consideration of the specification as illustrated by the accompanying drawings of an illustrative embodiment of the invention, in which drawings:

Fig. 1 is a plan view, partly in section, of a tool holder illustrating the invention as it will appear when viewed from the rear of a lathe facing the operator;

Fig. 2 is an elevation thereof, partly in section, looking toward the operator, the boring bar head being shown in adjusted position in dotted lines;

Fig. 3 is a cross-sectional view taken on the line 3—3 of Fig. 1;

Fig. 4 is a cross-sectional view taken on the line 4—4 of Fig. 1; and

Fig. 5 is a cross-sectional view taken on the line 5—5 of Fig. 2 and of Fig. 3.

Referring to said drawings, the numeral 11 indicates the tool rest of a lathe formed with the usual T-slot 12 receiving the T-head 13 of a tool post 14. 15 indicates the usual rocker ring which is shown upside down from the position it usually occupies when used with the usual rocker. 16 indicates the usual clamping screw of the tool post.

The tool holder proper comprises a body member or shank 20 received in the tool post and clamped against the ring 15 by the clamping screw 16. Therefore, its bottom edge will always be held parallel to the ways of the lathe and lie in a plane parallel to the axis of the headstock. Attached to the forward end of the body member of shank 20 is a boring bar head member 21 provided with a cylindrical hole 22 for receiving the boring bar 23, which bar is clamped in place by suitable means such as the set screw 24. The axis of hole 22 and bar 23 is preferably parallel to the plane of the bottom edge of the shank 20 and therefore will always be in a plane parallel to the axis of the headstock.

The boring bar head is preferably provided with a dovetail groove 25 or other under-cut groove such as a T-slot within which is slidably received the dovetail or other complementary block 26. Said block is provided with an internally-threaded hole receiving the clamp screw 27. Under the head of said screw is provided a washer 28 which may be of the cup type, as shown, or a plain flat washer. Mounted under said washer is a spring washer 29 which may be formed, as shown, of a dished conformation. When the set screw 27 is tightened down, the washer 29 will be substantially flat but when screw 27 is loosened the washer will assume a position something like that shown in Figs. 4 and 5 so that it will apply a slight pull upon the dovetail block 26 so as to hold the parts together during vertical adjustment but not to apply sufficient friction to prevent such adjustment.

In the form shown, the means for providing vertical adjustment comprises an adjusting or lead screw 30 having a knurled knob 30A. This screw is connected to the boring bar head 21 for relative rotation but against relative longitudinal movement by any suitable means such as a half-ring 31 of suitable hard material, such as tool steel, held in a corresponding recess in the boring bar head 21 and received in a groove 32 in the shank of the adjusting screw 30. The lower part of said screw is threaded as at 30B, which threads engage with internal threads in a half-ring 33 carried in a corresponding recess in the shank 20. It will be seen that if clamping screw 27 is released and adjusting screw 30 is rotated, the boring bar head 21 will be raised or lowered relative to member 20. In the form shown, the adjusting screw 30 will move up or down with the head 21 so that the knob 30A may be arranged close to the top of the boring bar head.

It is of course to be understood that the half rings 31 and 33 may be reversed, in which case the adjusting screw 30 would not rise and fall with the boring head 21 but would move relatively thereto. The ends of the half ring 31 lie adjacent the side face of the shank member 20, and the ends of the threaded half ring 33 lie adjacent the side face of the tool head member 21, whereby the said rings are prevented from rotating. They are therefore held in their recesses against displacement in any direction.

The dovetail 25 and dove tail block 26 are not intended to serve to guide the boring bar head relative to the shank member. This guiding is accomplished entirely by the screw 30 through its cooperation with appropriate recesses in the shank 20 and boring bar head 21, as seen best in Fig. 5.

When, after vertical adjustment, the clamping screw 27 is tightened, the adjusting screw 30 will be clamped tightly between the parts 20 and 21. To assure the best clamping action the recess in the head 21 is preferably cut away as indicated at 21A (Fig. 5) and the recess in the shank portion 20 is preferably cut away, as indicated at 20A. This will assure that pressure is applied to the screw 30 at four points to assure maximum rigidity. If these parts were not cut away, the bearing might occur at those points which would not assure a rigid holding of the boring bar head 21 relative to the shank 20.

The form of thread used is preferably of a type which leaves a substantial part of the cylindrical outside surface as a bearing area for guiding the tool head 21 during vertical adjustment and upon which the tool head is clamped during use. To this end it is desirable to use an "Acme" thread, as shown, or a square thread or, if desired, a buttress thread. A V thread may be used but will be found to be less satisfactory.

It will be noted that the tool head is accurately guided or held relative to the shank member by the engagement of the spaced limited areas thereof bearing upon the lead screw, similar to the V ways of a lathe.

As shown in Fig. 2, the boring bar head 21 may be adjusted upwardly to the position shown in dotted lines. In the form shown, this is the limit of upward movement since at that point the pin or other abutment 20B carried by the shank 20 is engaged by a shoulder 21B formed on the head 21. Similarly, downward adjustment of the head 21 from the full-line position shown in Fig. 2 may take place. In the position shown in Figs. 1 and 2, this downward adjustment would be limited by the engagement of the rear portion of the head 21 with the ring 15. If further adjustment is needed, however, the shank 20 would have to be released and moved out sufficiently far to prevent interference between the head 21 and the top of the ring 15.

While the tool holder has been shown and described primarily for use to support a boring bar, it is obvious that it may be used for other tools, such as lathe turning tools or lathe facing tools. It is especially valuable in the latter use since it is frequently necessary to have a facing tool exactly on the head stock axis so as to complete the facing operation.

It will be noted that vertical adjustment of the boring bar or other tool may be effected without loosening the boring bar for rotation about its axis. This is very important as such rotation would disturb the angle of top rake and relief and prevent making small exact vertical adjustments.

Furthermore, vertical adjustment may be effected without permitting rotation of the tool about the axis of the tool post. While the invention is illustrated by means of a tool holder of the type where the tool body is in the form of a shank for use in a tool post, it is obvious that the tool body may be made in any other form, particularly a form which is directly fastened in the T slots of the lathe tool rest.

It is also obvious that the tool may be used in boring mills, shapers, planers, etc.

Furthermore, the construction shown for adjusting, guiding, and holding the relatively slidable parts is applicable to various uses such as where a part is to be adjusted relatively to another part, such as the work holding bed of a milling machine or the tool rest slide of a lathe.

It will be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In a device of the character described, a body member, a support member, a lead screw located between said members in substantially semi-cylindrical recesses formed therein, said lead screw being connected to one of said members for relative rotation only and to the other member by screw-threads formed in its respective semi-cylindrical recess engaging with the threads on said lead screw, whereby rotation of said lead screw will cause relative sliding movement between said members in a direction parallel to the axis of the lead screw, and clamping means for pressing said members against said lead screw.

2. In a device of the character described, a body member, a support member, a lead screw located between said members in substantially semi-cylindrical recesses formed therein, said lead screw being connected to one of said members for relative rotation only and to the other member by screw-threads formed in its respective semi-cylindrical recess engaging with the threads on said lead screw, whereby rotation of said lead screw will cause relative sliding movement between said members in a direction parallel to the axis of the lead screw, and clamping means for pressing said members against said lead screw, said semi-cylindrical recesses being formed with depressions parallel to the axis of the lead screw to cause said lead screw to bear on two spaced interrupted cylindrical surfaces in each of said recesses.

3. In a device of the character described, a body member, a support member, a lead screw located between said members in substantially semi-cylindrical recesses formed therein, said lead screw being connected to one of said members for relative rotation only by means of a half-ring located in a corresponding recess in its respective member and extending into a circumferential recess in the lead screw, said lead screw being threadedly connected to the other member by means of a half-ring located in a corresponding recess in its respective member, said half-ring being formed with internal screw threads engaging with threads on the lead screw, whereby rotation of said lead screw will cause relative sliding movement between said members in a direction parallel to the axis of the lead screw.

4. The combination according to claim 3 in which the ends of the half-ring in each member lie adjacent the other member so that rotation of each of said half-rings is prevented.

5. In combination, a pair of relatively rectilinearly movable members having their adjacent faces formed to provide an opening extending longitudinally of said members in the direction of relative movement, a rotatable adjusting member extending longitudinally of said opening and connected to said relatively movable members for causing relative longitudinal movement therebetween upon rotation of said adjusting member, clamping faces on said relatively movable members engaging said adjusting member, and means for clamping said movable members together in adjusted position and simultaneously to cause said faces to lock said adjusting member against rotary movement.

6. In combination, a pair of relatively rectilinearly movable members, having their adjacent faces formed to provide an opening extending longitudinally of said members in the direction of relative movement, a rotatable adjusting member extending longitudinally of said opening and connected to said movable members to cause relative longitudinal movement thereof upon rotation of said adjusting member, each of said movable members having clamping faces located in the associated recesses and engaging the surface of said adjusting member, and means for clamping said movable members together in adjusted position so as to cause said faces to lock said adjusting member against rotary movement, including means for yieldingly holding said members in assembled relation upon release of said clamping means.

7. In combination, a pair of relatively rectilinearly movable members having their adjacent faces formed to provide an opening extending longitudinally of said members in the direction of relative movement, a rotatable lead screw extending longitudinally within said opening, means connecting one of said members to said lead screw for relative rotative movement only, the thread on said lead screw being so formed as to leave a substantial part of the cylindrical surface of said lead screw as an interrupted cylindrical bearing area, threaded means on the other of said relatively movable members meshing with said thread on the lead screw, and a bearing surface extending longitudinally of each member in said opening engaging said bearing area on the lead screw so as to guide the relative movement of said members, and means for clamping said relatively movable members upon the lead screw, whereby the lead screw is clamped against rotation and the members are thereby clamped against relative movement.

LUKAS ZIMMERMANN.

REFERENCES CITED

The following references are of record in the file of this patent:

UNITED STATES PATENTS

| Number | Name | Date |
| --- | --- | --- |
| 518,750 | Blue | Apr. 24, 1894 |
| 716,432 | Kingsbury | Dec. 23, 1901 |
| 1,482,916 | Dugar | Feb. 5, 1924 |
| 2,027,562 | Smith | Jan. 14, 1936 |
| 2,067,357 | Terry | Jan. 12, 1937 |
| 2,211,596 | Darash | Aug. 13, 1940 |
| 2,293,006 | Luers | Aug. 11, 1942 |
| 2,323,380 | Davis | July 6, 1943 |